United States Patent
Funakoshi

(10) Patent No.: US 10,897,092 B2
(45) Date of Patent: Jan. 19, 2021

(54) SPLICE CAP

(71) Applicant: YAZAKI CORPORATION, Tokyo (JP)

(72) Inventor: Shigeo Funakoshi, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/581,655

(22) Filed: Sep. 24, 2019

(65) Prior Publication Data

US 2020/0021043 A1    Jan. 16, 2020

Related U.S. Application Data

(63) Continuation of application No. PCT/JP2018/007063, filed on Feb. 26, 2018.

(30) Foreign Application Priority Data

Mar. 27, 2017  (JP) .................................. 2017-060714

(51) Int. Cl.
| | |
|---|---|
| *H02G 15/04* | (2006.01) |
| *H01R 4/22* | (2006.01) |
| *H01B 17/58* | (2006.01) |
| *H01R 4/70* | (2006.01) |
| *H02G 1/14* | (2006.01) |

(52) U.S. Cl.
CPC .............. *H01R 4/22* (2013.01); *H01B 17/58* (2013.01); *H01R 4/70* (2013.01); *H02G 1/14* (2013.01)

(58) Field of Classification Search
CPC ....................................................... H02G 15/04
USPC ........................................ 174/74 R, 74 A, 83
See application file for complete search history.

(56) References Cited

U.S. PATENT DOCUMENTS 3,624,270 A * 11/1971 Turner ..................... H01R 4/22
                                                                    174/87
8,674,230 B2 * 3/2014 Hoxha ............... H01R 13/5837
                                                                    174/135

FOREIGN PATENT DOCUMENTS

| JP | 1-159364 U | 11/1989 |
| JP | 8-185908 A | 7/1996 |
| JP | 11-233173 A | 8/1999 |
| JP | 2005-251400 A | 9/2005 |
| JP | 2012-182103 A | 9/2012 |

\* cited by examiner

*Primary Examiner* — Chau N Nguyen
(74) *Attorney, Agent, or Firm* — Kenealy Vaidya LLP

(57) ABSTRACT

A splice cap is configured to house a splice having a step. An electric wire draw-out port from which electric wires can be drawn-out is provided at one end of the splice cap. A splice insertion port provided on a lateral side of the splice cap continues from the electric wire draw out port such that the splice can be inserted therein from a direction orthogonal to the axial direction. A step engagement portion that continues from the splice insertion port is formed to face the step of the splice so as to be able to abut the step when the electric wires are pulled in the axial direction.

6 Claims, 7 Drawing Sheets

SPLICE CAP

CROSS-REFERENCE TO RELATED APPLICATIONS

The present application is a continuation application of PCT/JP2018/007063 that claims priority to Japanese Patent Application No. 2017-060714 filed on Mar. 27, 2017, the entire content of which is incorporated herein by reference.

TECHNICAL FIELD

The present invention relates to a splice cap that accommodates a splice formed at terminals of a plurality of electric wires constituting a wire harness.

BACKGROUND

In related art, a technique disclosed in FIGS. 6 and 7 of Patent Literature 1 (JP2012-182103A) is known, which is a splice cap that accommodates a splice formed at terminals of a plurality of electric wires constituting a wire harness.

As shown in FIGS. 6 and 7 of Patent Literature 1, a splice cap 100 is made of insulating resin and includes a cap main body 110 and a harness fixing portion 120.

As shown in FIG. 7 of Patent Literature 1, the cap main body 110 is formed in a bottomed cylindrical shape in which one end in a longitudinal direction is closed while the other end is opened. The cap main body 110 is configured as a portion that accommodates a splice 131 of wires formed at a terminal of an electric wire bundle 130 branched from a trunk line of a wire harness. Here, a "splice" is also referred to as a "bonder" and, as shown in FIGS. 6 and 7 of Patent Literature 1, is a concentrated connection end that connects and integrates conductor end portions 132a of a plurality of electric wires 132 constituting the electric wire bundle 130 with each other.

As shown in FIGS. 6 and 7 of Patent Literature 1, the harness fixing portion 120 is formed continuously in a region of the opened other end of the cap main body 110, and is formed as a portion extending in a tongue shape along an axial direction of the cap main body 110 (a direction indicated by arrow X1 shown in FIG. 6). The harness fixing portion 120 is configured as a portion that is bound to the electric wire bundle 130 by an adhesive tape 140 in order to prevent the cap main body 110 from coming off from the splice 131.

An operation of attaching the splice cap 100 to the splice 131 is performed as follows. First, the splice 131 is inserted from the opened other end side of the cap main body 110, and is attached to the cap main body 110. Thereafter, as a second step, the harness fixing portion 120 and the electric wire bundle 130 are bound by an adhesive tape 140, and the electric wire bundle 130 is fixed to the harness fixing portion 120. Accordingly, the operation of attaching the splice cap 100 to the splice 131 is completed.

In the related art however, the operation of attaching the splice cap to the splice has the following problems.

That is, in the related art, since the splice is inserted from the opened other end side of the cap main body, an operator has to locate an insertion position of the splice. Also, since the operator inserts the splice along the axial direction of the cap main body from the opened other end side of the cap main body, an insertion movement distance of the splice is long. Therefore, poor workability in attaching the splice cap to the splice is the problem of the related art.

In addition, in the related art, after attaching the splice to the cap main body, extra steps are required for the operator to change the way to hold the splice cap and to bind the harness fixing portion and the electric wire bundle by the adhesive tape. This is another example of poor workability of the related art, in attaching the splice cap to the splice is not favorable.

Further, in the related art, since the adhesive tape is used for fixing the electric wire bundle to the harness fixing portion, material costs for the adhesive tape are needed.

The present invention is made in view of the above circumstances, and an object of the present invention is to provide a splice cap configured to improve the workability of the operation of attaching the splice cap to the splice. Another object of the present invention is to provide a splice cap configured to reduce the material costs for the attaching operation of the splice cap to the splice, while preventing the splice cap from coming off from the splice after being attached to the splice.

SUMMARY

The above objects of the present invention are achieved by the following configurations (1) to (3). (1) A splice cap is configured to accommodate a splice formed at terminals of a plurality of electric wires. The splice is to be accommodated in the splice cap is formed into a shape having a step. The splice cap is formed in a bottomed cylindrical shape in which one end in a longitudinal direction is closed and another end in the longitudinal direction is opened, and the other end, which is opened, is configured to provide an wire draw-out port allowing the plurality of electric wires to be guided out in a state in which the splice is accommodated in the splice cap. The splice cap includes a splice insertion opening and a step engagement portion. The splice insertion opening is provided on a lateral side of the splice cap, the splice insertion opening is formed to be continuous with the wire draw-out port and to be opened along an axial direction of the splice cap over a side of the one end, and the splice insertion opening is configured such that the splice is insertable into the splice insertion opening in a direction orthogonal to the axial direction of the splice cap. The step engagement portion is provided to be continuous with the splice insertion opening, the step engagement portion is formed to face the step when the splice is accommodated in the splice cap, and the step engagement portion is configured to contact the step when the plurality of electric wires is pulled in the axial direction of the splice cap.

According to the splice cap having the configuration (1), the other end of the splice cap is configured as the wire draw-out port, and the splice insertion opening is formed in the side surface to be continuous with the wire draw-out port and to extend along an axial direction of the splice cap toward a side of the one end. Therefore, the splice can be inserted into the splice insertion opening from the direction orthogonal to the axial direction of the splice cap. Further, the step engagement portion is formed to be opposed to the step when the splice is accommodated in the splice cap. Therefore, when the splice is accommodated in the splice cap, the step engagement portion and the step of the splice face each other. Therefore, when the splice moves in the axial direction of the splice cap, the step contacts the step engagement portion.

(2) The splice cap according to (1), in which the splice cap is provided with a flexible holding piece at the splice insertion opening.

According to the splice cap having the configuration (2), a flexible holding piece is provided at the splice insertion opening. Since the holding piece is flexible, the holding piece can be bent in an insertion direction of the splice when the splice is inserted into the splice insertion opening. When the splice goes inside the splice cap, the holding piece returns to the state before the splice is inserted into the splice insertion opening. Then, an inner surface of the holding piece faces the plurality of electric wires. Therefore, for example, when the plurality of electric wires move to a side from which the splice starts to be inserted into the splice insertion opening, the plurality of electric wires contact the inner surface of the holding piece.

(3) The splice cap according to (2), in which an inner surface of the holding piece is formed in an inclined shape so as to become thinner toward a tip end of the holding piece.

According to the splice cap having the configuration (3), since the inner surface of the holding piece is formed in the inclined shape so as to become thinner toward the tip end of the holding piece, the holding piece becomes thinner toward the tip end of the holding piece. A base end side of the holding piece is thicker than a tip end side. Therefore, the holding piece easily bends in the insertion direction of the splice, while rigidity of the base end side is secured.

According to the splice cap having the configuration (1), the splice can be inserted into the splice insertion opening along the direction orthogonal to the axial direction of the splice cap. Therefore, compared with the splice cap of the related art, location of the insertion position of the splice becomes easy, making insertion of the splice into the splice insertion opening easy at the same time. Also the insertion movement distance of the splice is shortened. Therefore, according to the splice cap of the present invention, the workability of the operation of attaching the splice cap to the splice can be improved.

According to the splice cap having the configuration (1), when the splice moves in the axial direction of the splice cap, the step contacts the step engagement portion. Therefore, even when the plurality of electric wires are pulled toward the wire draw-out port side, for example, movement of the splice toward the wire draw-out port side can be restricted without binding the splice cap and the plurality of electric wires by the adhesive tape. Therefore, according to the splice cap of the present invention, the material cost for attaching operation of the splice cap to the splice can be reduced, and the splice cap can be prevented from coming off from the splice after being attached to the splice.

According to the splice cap having the configuration (2), in addition to the effect of the configuration (1), the following effect is also achieved. That is, for example, since the plurality of electric wires contact the inner surface of the holding piece when the plurality of electric wires move to side from which the splice starts to be inserted into the splice insertion opening, even in a case where the plurality of electric wires move to the insertion start side, movement toward the insertion start side can be restricted without binding the splice cap and the plurality of electric wires by the adhesive tape. Therefore, according to the splice cap of the present invention, the splice cap can be more reliably prevented from coming off from the splice after being attached to the splice.

According to the splice cap having the configuration (3), in addition to the effect of the configuration (2), the following effect is also achieved. That is, since the holding piece easily bends in the insertion direction of the splice while the rigidity of the base end side is secured, the splice can be easily inserted into the splice insertion opening even if the holding piece is provided at the splice insertion opening. Therefore, according to the splice cap of the present invention, the workability of the operation of attaching the splice cap to the splice can be further improved.

DESCRIPTION OF EMBODIMENTS

Hereinafter, embodiments of a splice cap according to the present invention will be described with reference to FIGS. 1 to 5.

Figure 1:
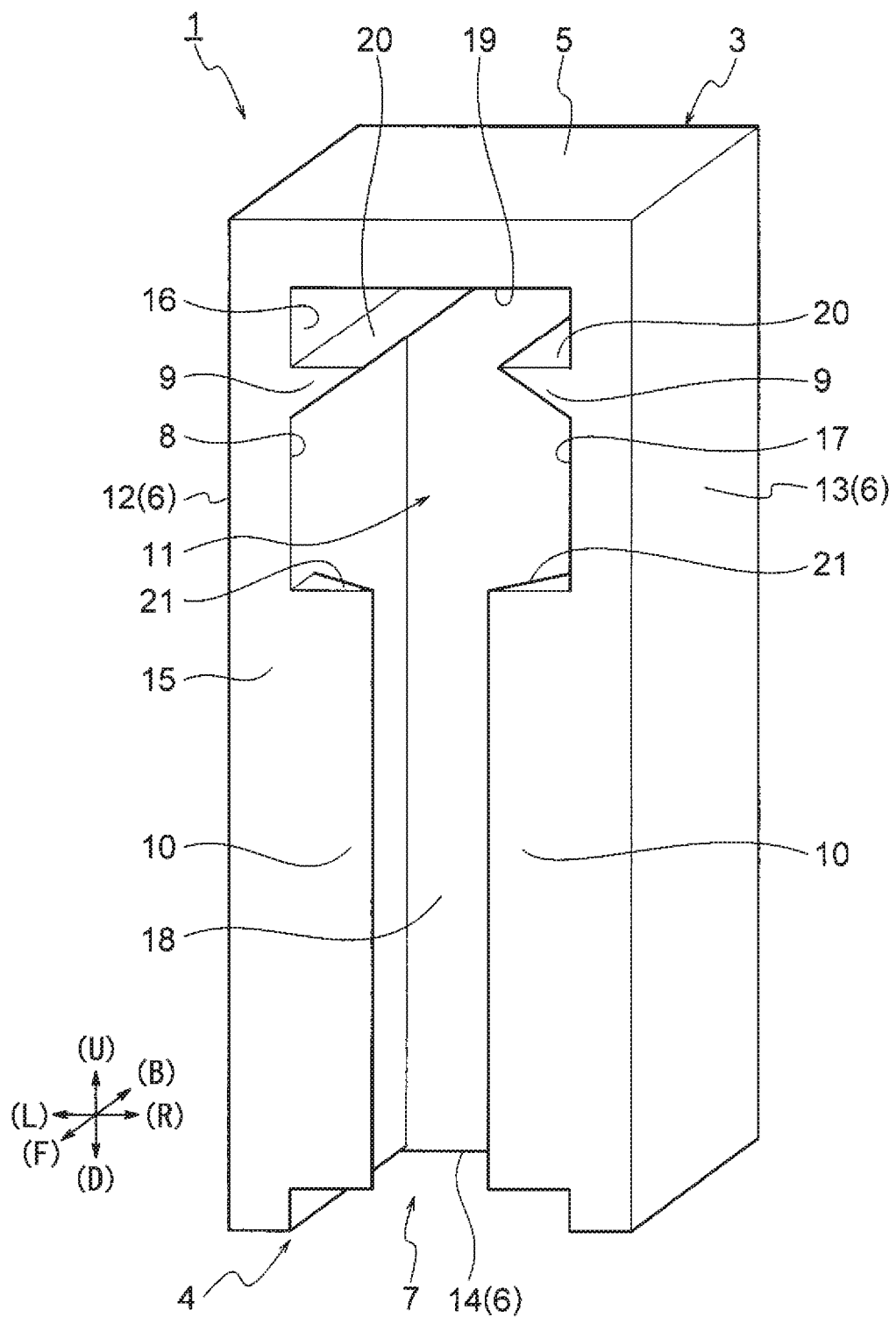
FIG. 1 is a perspective view of a splice cap according to an embodiment of the present invention.
Figure 2:
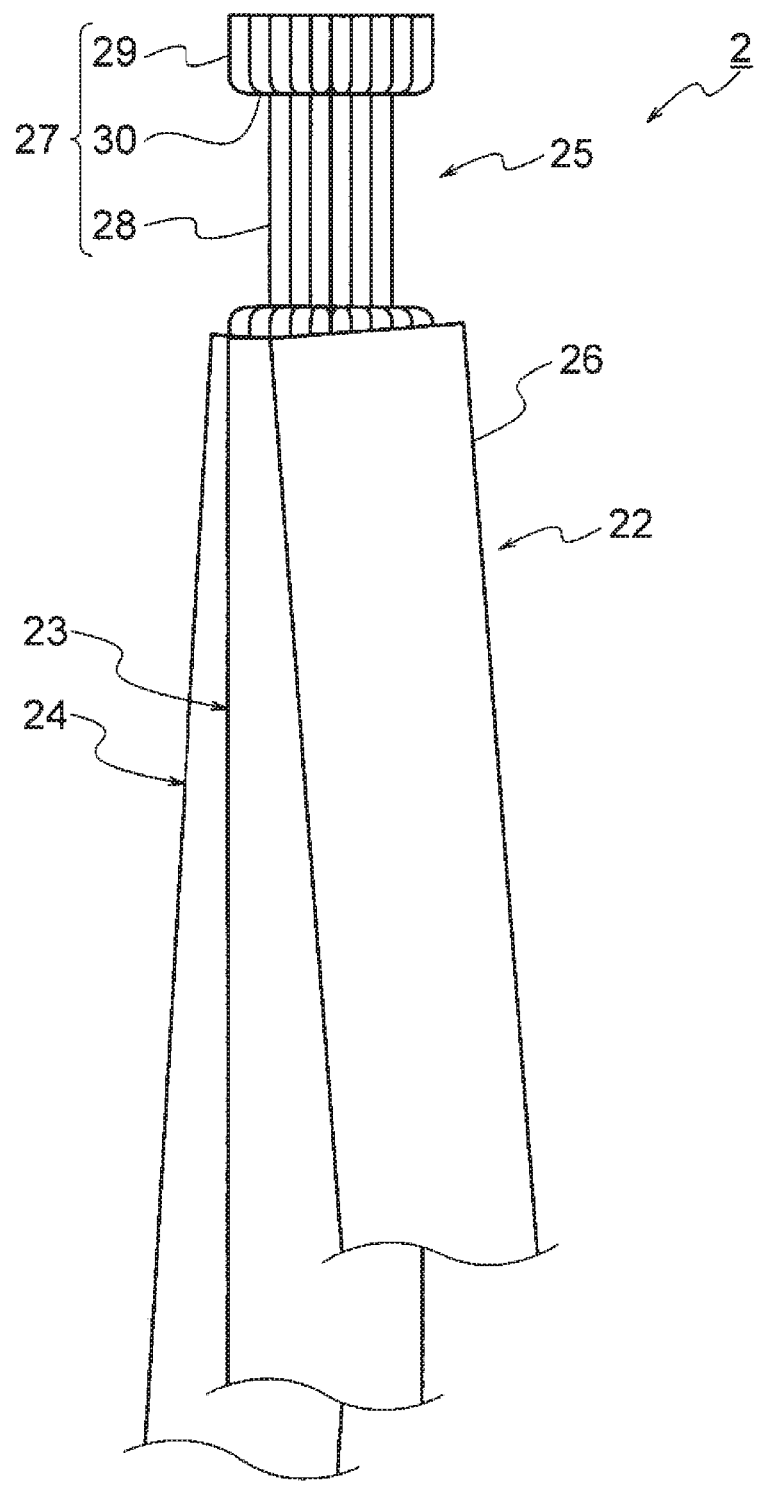
FIG. 2 shows a terminal portion of an electric wire bundle to which the splice cap according to the embodiment of the present invention is to be applied.
Figure 3:
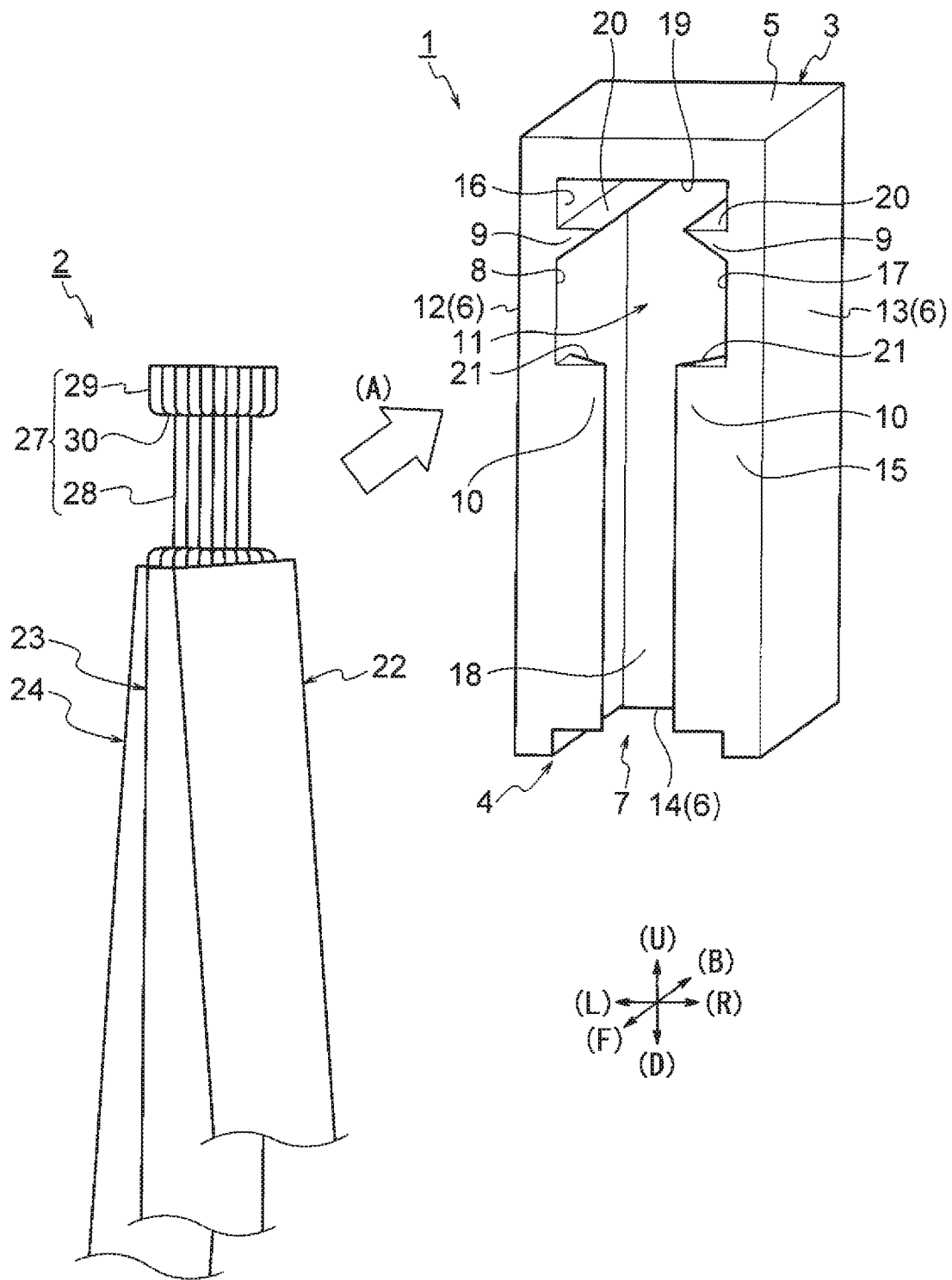
FIG. 3 shows a state before the splice cap is attached to a splice.
Figure 4:
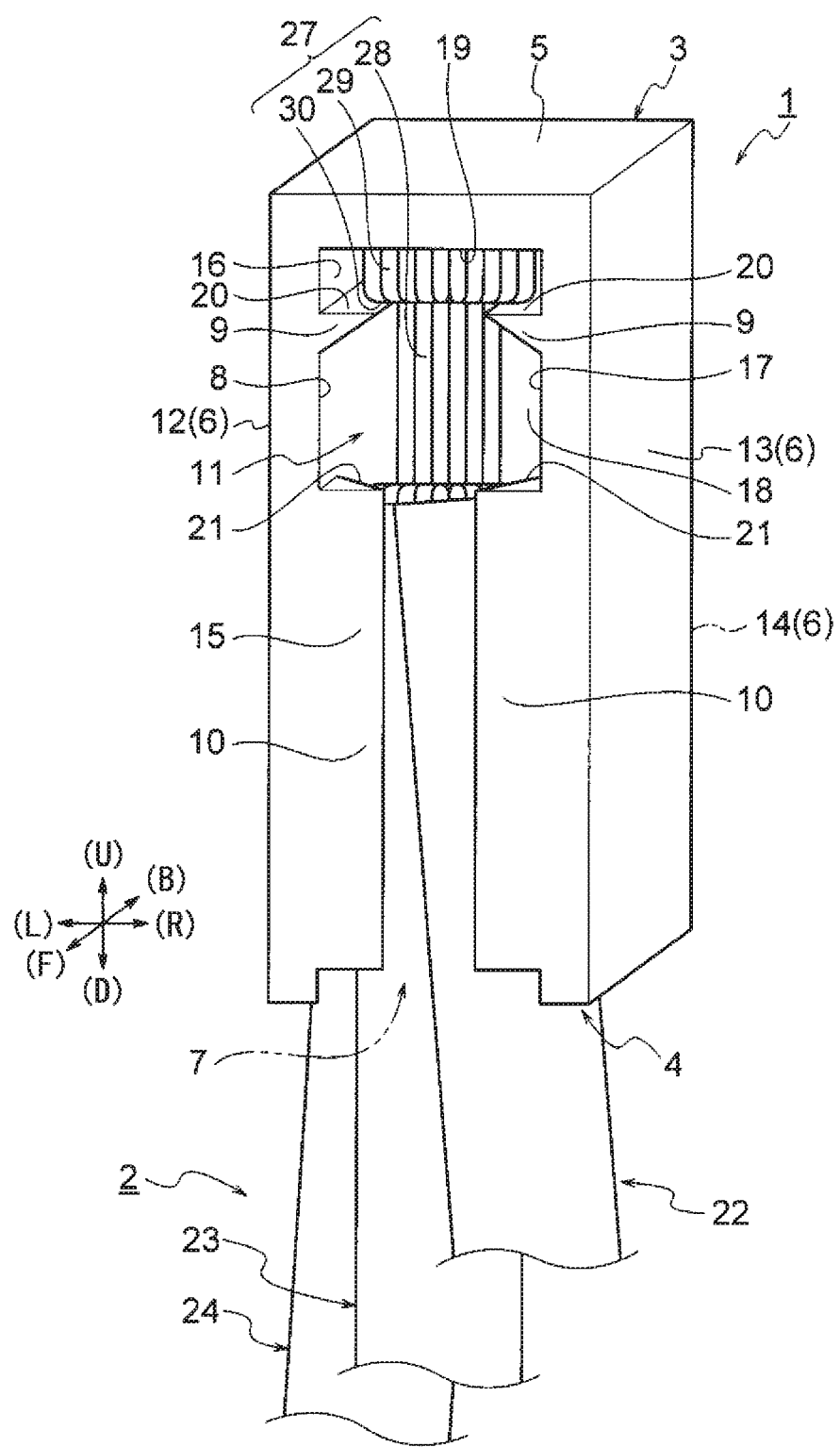
FIG. 4 shows a state after the splice cap is attached to the splice.
Figure 5:
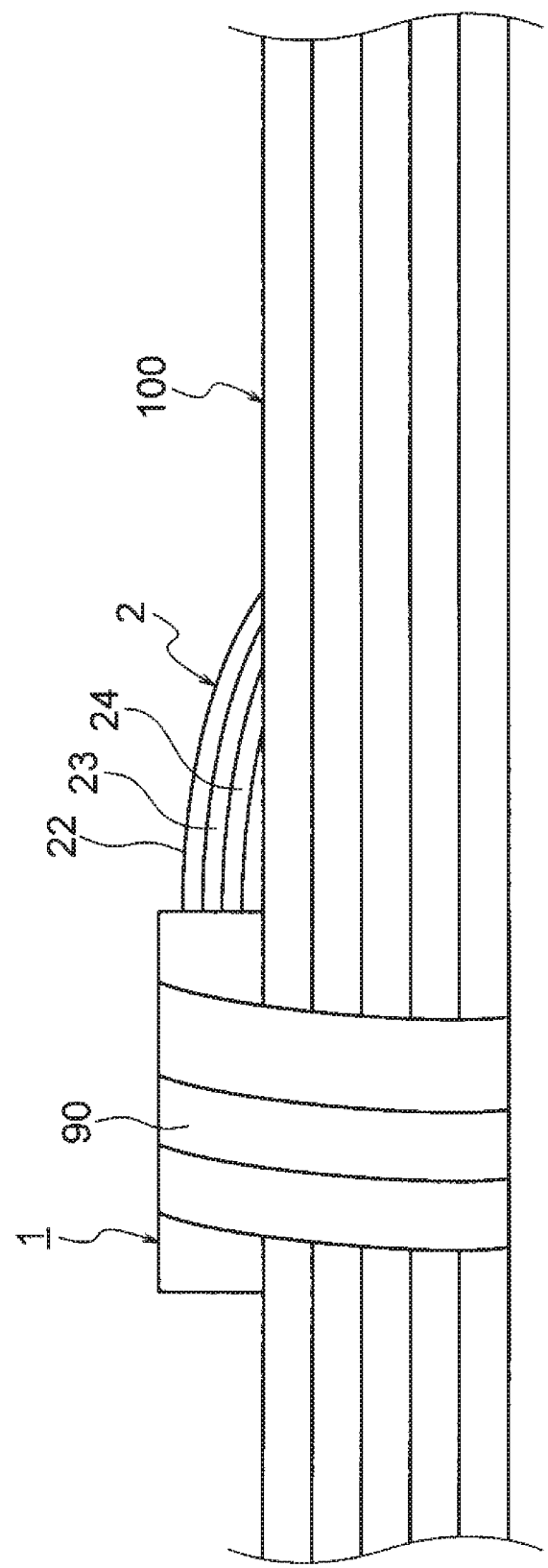
FIG. 5 shows a state in which the splice cap attached to the splice is fixed to a wire harness.

FIG. 1 is a perspective view of a splice cap according to an embodiment of the present invention. FIG. 2 shows a terminal portion of an electric wire bundle to which the splice cap according to the embodiment of the present invention is to be applied. FIG. 3 shows an operation of attaching the splice cap to a splice, which shows a state before the splice cap is attached to the splice. FIG. 4 shows a step that follows a step shown in FIG. 3, showing a state after the splice cap is attached to the splice. FIG. 5 shows a state in which the splice cap attached to the splice is fixed to a wire harness. Arrows in the drawings indicate directions of up (U), down (D), left (L), right (R), front (F), and back (B) (each direction indicated by the arrows is an example).

In FIG. 1, a splice cap 1 according to an embodiment of the present invention is a member attached to a splice 27 to be described below, the splice 27 being formed on a terminal of an electric wire bundle 2 (see FIG. 2) branched from a trunk line of a wire harness 100 (see FIG. 5) disposed on a vehicle or the like. Hereinafter, the splice cap 1 according to the embodiment of the present invention will be described first, and then the electric wire bundle 2 to which the splice cap 1 according to the embodiment of the present invention is to be applied will be described.

First, the splice cap 1 according to the embodiment of the present invention will be described. The splice cap 1 shown in FIG. 1 is made of an insulating resin material that does not conduct electricity, and is formed in a bottomed cylindrical shape in which one end 3 in a longitudinal direction (an upper end in an up-down direction (direction of arrow (U)-(D)) in FIG. 1) is closed, and the other end 4 in the longitudinal direction (a lower end in the up-down direction (direction of arrow (U)-(D)) in FIG. 1) is opened.

The splice cap 1 includes: an upper wall 5; a peripheral walls 6; an wire draw-out port 7; a splice insertion opening 8; a pair of step engagement portions 9; a pair of holding pieces 10; and an accommodating portion 11. As shown in FIG. 1, the upper wall 5 is closed at the one end 3 in the longitudinal direction of the splice cap 1. The peripheral walls 6 includes: a left side wall 12; a right side wall 13; and a rear wall 14.

The left side wall 12 is continuous with a left edge of the upper wall 5 in a left-right direction in FIG. 1 (direction of arrow (L)-(R)), and extends toward the other end 4 side (downward direction in FIG. 1 (direction of arrow (D))) along an axial direction of the splice cap 1 (the up-down direction in FIG. 1 (direction of arrow (U)-(D))). The right side wall 13 is continuous with a right edge of the upper wall 5 in the left-right direction in FIG. 1 (direction of arrow (L)-(R)), and extends toward the other end 4 side along the axial direction of the splice cap 1.

The rear wall 14 is continuous with a rear edge of the upper wall 5 in a front-back direction in FIG. 1 (direction of arrow (F)-(B)), and extends toward the other end 4 side (downward direction in FIG. 1 (direction of arrow (D))) along the axial direction of the splice cap 1 (the up-down direction in FIG. 1 (direction of arrow (U)-(D))).

As shown in FIG. 4, the wire draw-out port 7 shown in FIG. 1 is formed as a portion configured to guide out electric wires 22 to 24 when the splice 27 is accommodated in the splice cap 1. The wire draw-out port 7 is constituted by the opened other end 4 of the splice cap 1.

The splice insertion opening 8 is formed as a portion into which the splice 27 is inserted so as to accommodate the splice 27 in the accommodating portion 11. As shown in FIG. 1, the splice insertion opening 8 is provided in a front surface 15 of the splice cap 1 (corresponding to the "a lateral side of the splice cap" in the claims), and provided as an opening toward the one end 3 side along the axial direction (the up-down direction in FIG. 1 (direction of arrow (U)-(D))) of the splice cap 1 so as to be continuous with the wire draw-out port 7. The splice insertion opening 8 is formed so that the splice 27 can be inserted in a direction orthogonal to the axial direction of the splice cap 1 (the front-back direction in FIG. 1 (direction of arrow (F)-(B))).

As shown in FIG. 4, the pair of step engagement portions 9 is formed as portions which a step 30 to be described below contacts when the electric wires 22 to 24 move in the axial direction of the splice cap 1 (a downward direction in FIG. 4 (direction of arrow (D))) when the splice 27 is accommodated in the splice cap 1. As shown in FIG. 1, the step engagement portions 9 are provided to be continuous with the splice insertion opening 8. The step engagement portions 9 are respectively formed on an inner surface 16 of the left side wall 12 and on an inner surface 17 of the right side wall 13 on the one end 3 side and protrude inward the splice cap 1. The step engagement portions 9 extend along a direction in which the splice 27 is inserted into the splice insertion opening 8 (the front-back direction in FIG. 1).

As shown in FIG. 1, an upper surface of each step engagement portion 9 is formed as a step contact surface 20. As shown in FIG. 4, the step contact surface 20 has a planar shape orthogonal to the axial direction of the splice cap 1, and faces the step 30 when the splice 27 is accommodated in the splice cap 1, The step contact surface 20 is configured to contact the step 30 when the electric wires 22 to 24 move in the axial direction of the splice cap 1 (the downward direction in FIG. 4 (direction of arrow (D))).

As shown in FIG. 4, the pair of holding pieces 10 is formed as portions which the electric wires 22 to 24 contacts when the electric wires 22 to 24 move in the direction orthogonal to the axial direction of the splice cap 1 (a front direction in FIG. 4 (direction of arrow (F))) when the splice 27 is accommodated in the splice cap 1. As shown in FIG. 1, the holding pieces 10 are provided to be continuous with edge portions of the splice insertion opening 8 in the axial direction of the splice cap 1 (the up-down direction in FIG. 1 (direction of arrow (U)-(D))), and protrude inward the splice insertion opening 8. The holding pieces 10 extend along the axial direction of the splice cap 1 from the other end 4 side to a substantial middle portion.

The holding pieces 10 are flexible portions, and are formed to bend in the direction orthogonal to the axial direction of the splice cap 1 (the front-back direction in FIG. 1 (direction of arrow (F)-(B))) with edge portions of the splice insertion opening 8 in the axial direction of the splice cap 1 (the up-down direction in FIG. 1 (direction of arrow (U)-(D))) as an axis. As shown in FIG. 1, each holding piece 10 is formed in an inclined shape so that an inner surface 21 thereof becomes thinner toward a tip end of the holding piece 10.

As shown in FIG. 1, the accommodating portion 11 is an internal space of the splice cap 1, and is configured to accommodate the splice 27 and terminals of each of the electric wires 22 to 24.

Next, the electric wire bundle 2 to Which the splice cap 1 according to the present invention is to be applied will be described. As shown in FIG. 2, the electric wire bundle 2 is formed by bundling a plurality of (three in this embodiment) electric wires 22 to 24. In the present embodiment, the electric wire bundle 2 includes three electric wires, but the number of electric wires is not limited thereto.

In the present embodiment, the electric wires 22 to 24 have the same configuration. Taking the electric wire 22 as a representative example, the electric wire 22 includes a conductor 25 and an insulator 26. As shown in FIG. 2, in the electric wires 22 to 24, the insulators 26 are peeled off at respective terminals, and the conductors 25 are thus exposed.

As shown in FIG. 2, the splice 27 is formed at a terminal of the electric wire bundle 2. Here, the "splice" is also referred to as a "bonder" and, as shown in FIG. 2, is a concentrated connection end that connects and integrates the conductors 25 of the electric wires 22 to 24 constituting the electric wire bundle 2 with each other. As shown in FIG. 2, the splice 27 includes a conductor connecting portion 28 and a conductor non-connecting portion 29, and is formed in a shape having the step 30, the step 30 having a surface orthogonal to an axial direction of the conductor connecting portion 28.

In the present embodiment, as shown in FIG. 2, the conductor connecting portion 28 is formed as a concentrated connection end that connects and integrates portions of the exposed conductors 25 of the electric wires 22 to 24 on the insulator 26 side with each other. In the present embodiment, the conductor connecting portion 28 is formed by connecting and integrating the conductors 25 with each other by thermo-compression bonding. Here, although not particularly shown, the "thermos-compression bonding" means that the conductors 25 are electrically connected to each other by applying heat and pressure to exposed portions of the conductors 25 on the insulator 26 side by using a thermos-compression bonding machine or the like.

In addition to the thermos-compression bonding, the conductor connecting portion 28 may be formed by connecting and integrating the conductors 25 by, for example, resistance welding, ultrasonic welding, or the like.

In the present embodiment, as shown in FIG. 2, the conductor non-connecting portion 29 is a tip end side of the exposed conductors 25 of the electric wires 22 to 24, and is formed as a portion where the conductors 25 are not connected to each other.

As shown in FIG. 2, the step 30 is provided between the conductor connecting portion 28 and the conductor non-connecting portion 29. As shown in FIG. 4, the step 30 is configured to contact the step contact surface 20 when the plurality of electric wires 22 to 24 move in the axial direction of the splice cap 1 (the downward direction in FIG. 4 (direction of arrow (D))) when the splice 27 is accommodated in the splice cap 1.

A configuration of the splice 27 is not limited to the configuration in the present embodiment. In addition, for example, the conductor connecting portion may be formed by applying thereto-compression bonding to the tip end side of the exposed conductors 25 of the electric wires 22 to 24, so as to form a shape expanding in a direction orthogonal to an axial direction of the electric wire bundle 2. In this case, the portion indicated by reference numeral 28 shown in FIG. 2 is to be the conductor non-connecting portion, and the portion indicated by reference numeral 29 shown in FIG. 2 is to be the conductor connecting portion. In addition, the configuration of the splice 27 may be replaced by modifications described below.

Next, an attaching operation of the splice cap 1 according to the embodiment of the present invention to the splice 27 will be described.

First, as shown in FIG. 3, the electric wire bundle 2 is disposed in a state in which the axial direction of the electric wire bundle 2 is along the axial direction of the splice cap 1. Thereafter, the electric wire bundle 2 is moved in the direction orthogonal to the axial direction of the splice cap 1 (direction indicated by arrow (A) shown in FIG. 3), and the splice 27 starts to be inserted into the splice insertion opening 8. Here, the splice 27 is inserted into the splice insertion opening 8 so that the step 30 faces the step contact surface 20.

While the splice 27 is being inserted into the splice insertion opening 8, the pair of holding pieces 10 is pressed with a terminal of the electric wire bundle 2 (electric wires 22 to 24) and bends in the insertion direction of the splice 27 (rearward direction in FIG. 3 (direction of arrow (B))). Thereafter, the splice 27 passes through the splice insertion opening 8 and is accommodated inside the accommodating portion 11 as shown in FIG. 4. Then, the splice 27 is disposed such that the step 30 faces the step contact surface 20, Also the pair of holding pieces 10 returns to the state before the splice 27 starts to be inserted into the splice insertion opening 8, and the inner surface 21 faces the splice 27 and the terminal of the electric wire bundle 2. Accordingly, the operation of attaching the splice cap 1 to the splice 27 is completed.

Next, an operation of fixing the splice cap 1 according to the embodiment of the present invention to the trunk line of the wire harness 100 will be described.

After the operation of attaching the splice cap 1 to the splice 27 is completed, as shown in FIG. 5, the splice cap 1 is bound to the trunk line of the wire harness 100 by an adhesive tape 90. In this way, the splice cap 1 is fixed to the trunk line of the wire harness 100. Accordingly, the operation of fixing the splice cap 1 to the trunk line of the wire harness 100 is completed.

Next, an operation of the present embodiment when the splice 27 moves in the axial direction of the splice cap 1 when the splice cap 1 according to the embodiment of the present invention is attached to the splice 27 will be described.

As shown in FIG. 4, when the splice 27 is accommodated in the accommodating portion 11, when the electric wires 22 to 24 are pulled to the other end 4 side (downward direction in FIG. 4 (direction of arrow (D))), the step 30 contacts the step contact surface 20. Therefore, movement of the splice 27 toward the other end 4 (wire draw-out port 7) side is restricted.

When the splice 27 moves to the one end 3 side (upward direction in FIG. 4 (direction of arrow (U))), the splice 27 contacts an inner surface 19 of the upper wall 5, and movement of the splice 27 toward the one end 3 side is restricted. Accordingly, axial direction movement of the splice 27 with respect to the splice cap 1 is restricted.

Next, an operation of the present embodiment when the splice 27 moves in the direction orthogonal to the axial direction of the splice cap 1 when the splice cap 1 according to the embodiment of the present invention is attached to the splice 27 will be described.

As shown in FIG. 4, when the splice 27 being accommodated inside the accommodating portion 11 moves toward a side from which the splice 27 starts to be inserted into the splice insertion opening 8 (forward direction in FIG. 4 (direction of arrow (F))), the electric wires 22 to 24 contact the inner surfaces 21 of the pair of holding pieces 10. Therefore, movement of the splice 27 toward the insertion start side of the splice 27 is restricted.

When the splice 27 moves in a rearward direction in FIG. 4 (direction of arrow (B)), the splice 27 contacts an inner surface 18 of the rear wall 14, and movement of the splice 27 in the rearward direction (direction of arrow (B)) is restricted. When the splice 27 moves in a left-right direction in FIG. 4 (direction of arrow (L)-(R)), the splice 27 contacts the inner surface 16 of the left side wall 12 or the inner surface 17 of the right side wall 13, and movement of the splice 27 in the left-right direction (direction of arrow (L)-(R)) is restricted. Accordingly, movement of the splice 27 in the direction orthogonal to the axial direction with respect to the splice cap 1 is restricted.

Figure 6:
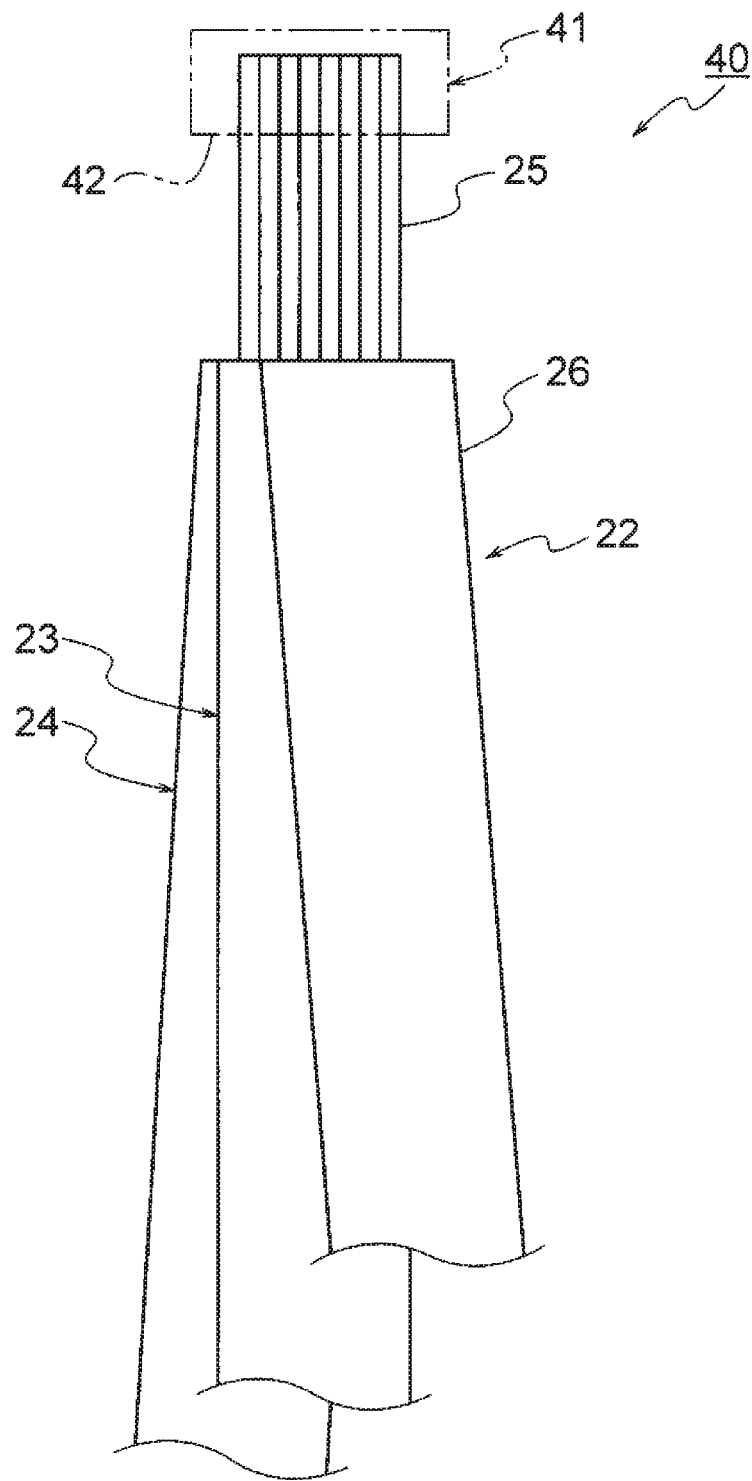
FIG. 6 shows Modification 1 of the electric wire bundle.
Figure 7:
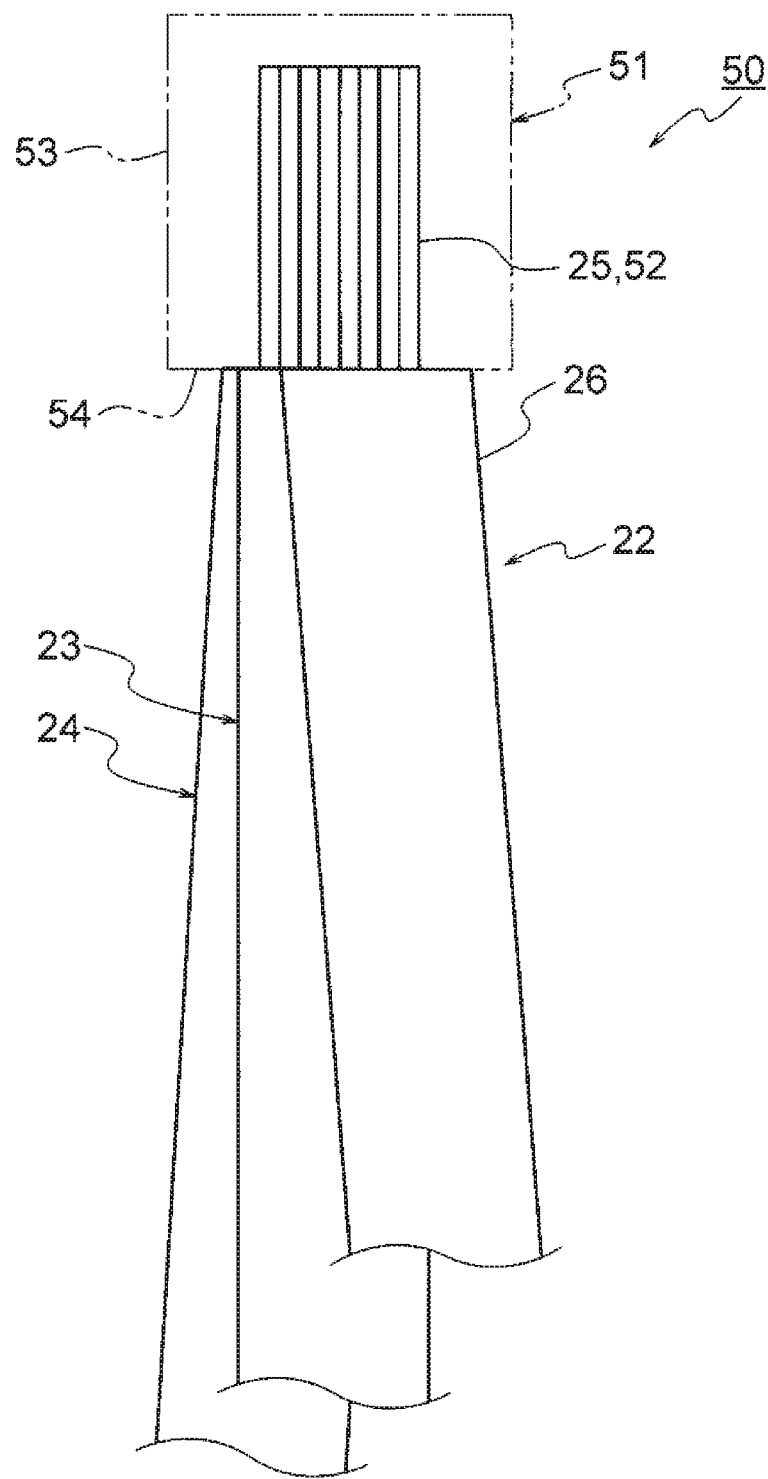
FIG. 7 shows Modification 2 of the electric wire bundle.

The electric wire bundle 2 to which the splice cap 1 according to the embodiment of the present invention is to be applied may be replaced by Modification 1 shown in FIG. 6 or Modification 2 shown in FIG. 7. Hereinafter, Modification 1 and 2 will be described.

In an electric wire bundle 40 according to Modification 1 shown in FIG. 6, a splice 41 is formed by connecting tip ends of the exposed conductors 25 of the electric wires 22 to 24 by soldering. The splice 41 is formed in a shape having a step 42, the step 42 having a surface orthogonal to an axial direction of the conductors 25.

Although not particularly shown, instead of the splice 41 in Modification 1, all of the exposed conductors 25 may be connected by soldering to form a splice having a shape that includes a step.

In an electric wire bundle 50 according to Modification 2 shown in FIG. 7, a splice 51 is formed by covering a conductor connecting portion 52 with an insulating protective member 53, the conductor connecting portion 52 constituted by connecting and integrating the exposed conductors 25 of the electric wires 22 to 24 with each other. The splice 51 is formed in a shape having a step 54, the step 54 having a surface orthogonal to the axial direction of the conductors 25.

In addition, although not particularly shown, a crimping sleeve made of a conductive metal may be used to connect the exposed conductors of the plurality of electric wires constituting the electric wire bundle to each other, so as to form a splice having a shape that includes a step, the step including a surface orthogonal to an axial direction of the crimping sleeve.

When the electric wire bundle 40 according to the Modification 1 or the electric wire bundle 50 according to Modification 2 is used, although not particularly shown, design of the splice cap 1 according to the present invention may be changed as appropriate, so that the splice insertion opening 8 can allow the splice 41 or the splice 51 to be inserted in the direction orthogonal to the axial direction of the splice cap 1.

When the electric wire bundle 40 according to the Modification 1 or the electric wire bundle 50 according to Modification 2 is used, although not particularly shown, the design of the splice cap 1 according to the present invention is changed as appropriate, so that the splice 41 or the splice 51 faces the step 42 or the step 54, and the splice 41 or the splice 51 contacts the step 42 or step 54 when the electric wires 22 to 24 move in the axial direction of the splice cap 1 when the splice 41 or the splice 51 is accommodated in the accommodating portion 11.

Next, effects of the splice cap 1 according to the embodiment of the present invention will be described. As described above with reference to FIGS. 1 to 7, according to the present embodiment, the splice 27, 41 or 51 can be inserted into the splice insertion opening 8 from the direction orthogonal to the axial direction of the splice cap 1, Therefore, compared with a splice cap of the related art, locating insertion position of the splice 27, 41 or 51 becomes easy, thereby making it easy to insert the splice 27, 41 or 51 into the splice insertion opening 8, and making an insertion movement distance of the splice 27, 41 or 51 short. Therefore, according to the splice cap 1 of the present embodiment, workability of the operation of attaching the splice cap 1 to the splice 27, 41, or 51 can be improved.

According to the present embodiment, when the splice 27, 41 or 51 moves in the axial direction of the splice cap 1, the step 30, 42 or 54 contacts the step contact surface 20. Therefore, for example, even when the electric wires 22 to 24 are pulled toward the wire draw-out port 7 side, movement of the splice 27, 41 or 51 toward the wire draw-out port 7 side can be restricted without binding the splice cap 1 and the electric wires 22 to 24 by an adhesive tape. Therefore, according to the splice cap 1 of the present embodiment, a material cost during the operation of attaching the splice cap 1 to the splice 27, 41 or 51 can be reduced, while preventing the splice cap 1 from coming off from the splice 27, 41 or 51 after being attached to the splice 27, 41 or 51.

According to the present embodiment, in addition to the above effects, the following effects are also achieved. That is, for example, when the electric wires 22 to 24 move to the side from which the splice 27, 41 or 51 starts to be inserted into the splice insertion opening 8, the electric wires 22 to 24 contact the inner surfaces 21 of the holding pieces 10. Therefore, even in a case where the electric wires 22 to 24 move to the insertion start side, movement toward the insertion start side can be restricted without binding the splice cap 1 and the electric wires 22 to 24 by the adhesive tape. Therefore, according to the splice cap 1 of the present embodiment, the splice cap 1 can be more reliably prevented from coming off from the splice 27, 41 or 51 after being attached to the splice 27, 41 or 51.

Further, according to the present embodiment, in addition to the above effects, the following effects are also achieved. That is, the holding pieces 10 easily bends in the insertion direction of the splice 27, 41 or 51, while rigidity of a base end side is secured. Therefore, the splice 27, 41 or 51 can be easily inserted into the splice insertion opening 8 even if the holding pieces 10 are provided at the splice insertion opening 8. Therefore, according to the splice cap 1 of the present embodiment, the workability of the operation of attaching the splice cap 1 to the splice 27, 41, or 51 can be further improved.

Here, features of the embodiment of the holding structure for voltage detection terminals according to the present invention will be briefly summarized below.

A splice cap (1) is configured to accommodate a splice (27, 41, or 51) formed at terminals of a plurality of electric wires (22 to 24). The splice (27, 41 or 51) is to be accommodated in the splice cap (1) is formed in a shape having a step (30, 42 or 54). The splice cap (1) is formed in a bottomed cylindrical shape in which one end (3) in a longitudinal direction is closed and the other end (4) in the longitudinal direction is opened, and the other end (4), which is opened, is configured to provide an wire draw-out port (7) allowing the plurality of electric wires (22 to 24) to be guided out when the splice (27, 41 or 51) is accommodated in the splice cap (1), Further, the splice cap (1) includes a splice insertion opening (8) and a step engagement portion (9). The splice insertion opening (8) is provided on a lateral side (front surface 15) of the splice cap (1), the splice insertion opening (8) being formed to be continuous with the wire draw-out port (7) and being opened along an axial direction of the splice cap (1) over a side of the one end (3) and being configured such that the splice (27, 41, or 51) is insertable into the splice insertion opening (8) in a direction orthogonal to the axial direction of the splice cap (1). The step engagement portion (9) is provided to be continuous with the splice insertion opening (8), and is formed to face the step (30, 42 or 54) with the splice (27, 41 or 51) being accommodated in the splice cap (1), and is configured to contact the step (30, 42 or 54) when the plurality of electric wires (22 to 24) is pulled in the axial direction of the splice cap (1).

The splice cap (1) may have the splice cap (1) that is provided with flexible holding pieces (10) at the splice insertion opening (8).

The splice cap (1) may have an inner surface of each of the holding pieces (10) that is formed in an inclined shape so that the holding pieces (10) becomes thinner toward a tip end of the holding piece (10).

Various modifications can be made to the present invention without departing from the spirit of the present invention. In addition, the material, shape, size, number, arrangement position, and the like of each component in the above-described embodiment are optional and are not limited as long as the effect of the present invention can be achieved.

The splice cap of the present invention can improve the workability of the operation of attaching the splice cap to the splice, reduce the material cost for the operation of attaching the splice cap to the splice, and prevent the splice cap from coming off from the splice after being attached to the splice.

What is claimed is:

1. A splice cap, configured to accommodate a splice formed of terminals of a plurality of electric wires,
   wherein the splice to be accommodated in the splice cap is formed into a shape having a step,
   the splice cap is formed in a bottomed cylindrical shape in which one end in a longitudinal direction is closed and another end in the longitudinal direction is opened, and the other end, which is opened, is configured to provide a wire draw-out port allowing the plurality of electric wires to be guided out in a state in which the splice is accommodated in the splice cap,
   the splice cap comprising:
   a splice insertion opening; and a step engagement portion, wherein the splice insertion opening is provided on a lateral side of the splice cap, the splice insertion opening is formed to be continuous with the wire draw-out port and to be opened along an axial direction of the splice cap over a side of the one end, and the splice insertion opening is configured such that the splice is insertable into the splice insertion opening in a direction orthogonal to the axial direction of the splice cap, wherein the step engagement portion is provided to be continuous with the splice insertion opening, the step engagement portion is formed to face the step when the splice is accommodated in the splice cap, and the step engagement portion is configured to contact the step when the plurality of electric wires is pulled in the axial direction of the splice cap, and wherein the splice cap is provided with a flexible holding piece at the splice insertion opening.

2. The splice cap according to claim 1, wherein an inner surface of the holding piece is formed in an inclined shape so that the holding piece becomes thinner toward a tip end of the holding piece.

3. The splice cap according to claim 1, wherein the step engagement portion is configured to restrict movement of the splice when the plurality of electric wires is pulled in the axial direction of the splice cap.

4. The splice cap according to claim 1, wherein the step engagement portion is a pair of step engagement portions respectively aligned on an inner surface of a left side wall of the splice cap and on an inner surface of a right side wall of the splice cap.

5. The splice cap according to claim 1, wherein the step engagement portion extends along a direction in which the splice is inserted into the splice insertion opening.

6. The splice cap according to claim 1, wherein the splice insertion opening is a fixed opening in the lateral side of the splice cap.

* * * * *